United States Patent [19]

Chen et al.

[11] Patent Number: 5,228,103
[45] Date of Patent: Jul. 13, 1993

[54] MONOLITHICALLY INTEGRATED WAVELENGTH DIVISION MULTIPLEXING LASER ARRAY

[75] Inventors: Yung J. Chen, Ellicot City; John Hryniewicz, Columbia, both of Md.; Pierre Goubet, Versailles, France

[73] Assignee: University of Maryland, College Park, Md.

[21] Appl. No.: 929,924

[22] Filed: Aug. 17, 1992

[51] Int. Cl.$^5$ .................. G02B 6/10; G02B 6/34; H04J 1/00; H01S 3/08

[52] U.S. Cl. .................. 385/14; 385/37; 385/33; 385/31; 385/24; 385/47; 385/49; 385/130; 385/131; 359/115; 359/124; 359/130; 359/131; 359/333; 359/346; 372/70; 372/102

[58] Field of Search .................. 385/8, 14, 15, 24, 31, 385/33, 37, 47–49, 129, 130, 131, 132; 359/115, 124, 130, 131, 134, 333, 341, 343, 345, 346; 372/70, 72, 12, 101, 102

[56] References Cited

U.S. PATENT DOCUMENTS

| | | | |
|---|---|---|---|
| 4,274,706 | 6/1981 | Tangonan | 385/37 X |
| 4,387,955 | 6/1983 | Ludman et al. | 385/37 |
| 4,571,024 | 2/1986 | Husbands | 359/130 |
| 4,634,215 | 1/1987 | Reule | 385/37 X |
| 4,652,080 | 3/1987 | Carter et al. | 385/47 |
| 4,715,027 | 12/1987 | Mahapatra et al. | 359/130 |
| 4,736,360 | 4/1988 | McMahon | 385/37 X |
| 4,773,063 | 9/1988 | Hunsperger et al. | 359/130 |
| 4,784,935 | 11/1988 | Ehrfeld et al. | 356/328 |
| 4,786,133 | 11/1988 | Gidon et al. | 385/14 |
| 4,852,079 | 7/1989 | Kinney et al. | 356/328 X |
| 4,971,415 | 11/1990 | Hara et al. | 385/37 |
| 4,999,489 | 3/1991 | Huggins | 250/226 |
| 5,134,671 | 7/1992 | Koren et al. | 385/14 |
| 5,179,605 | 1/1993 | Kaverhad et al. | 385/37 |

OTHER PUBLICATIONS

"Planar Rowland Spectrometer for Fiber Optic Wavelength Demultiplexing" Yen et al., Optics Letters, vol. 6, No. 12, pp. 639–641, Dec. 1981.

"Monolithic InP/InGaAsP/InP Grating Spectrometer for the 1.48–1.56 μm Wavelength Range", Soole et al., Applied Physics Letters, vol. 58, No. 18, pp. 1949–51, May 1991.

*Primary Examiner*—Brian Healy
*Attorney, Agent, or Firm*—Christopher N. Sears

[57] ABSTRACT

An active monolithic optical device for wavelength division multiplexing (WDM) incorporating diode laser arrays, an output coupling waveguide and a curved Rowland circle based grating to produce a plurality of individual laser beams at slightly different wavelengths is integrated in a common electro-optic material. The wavelength of each laser source is determined by the geometry of the array and the diffraction grating design. The output of all the channels can be collected into a concentrator or lens to be multiplexed in a single output. Applications include a WDM optical amplifier and WDM laser source.

22 Claims, 5 Drawing Sheets

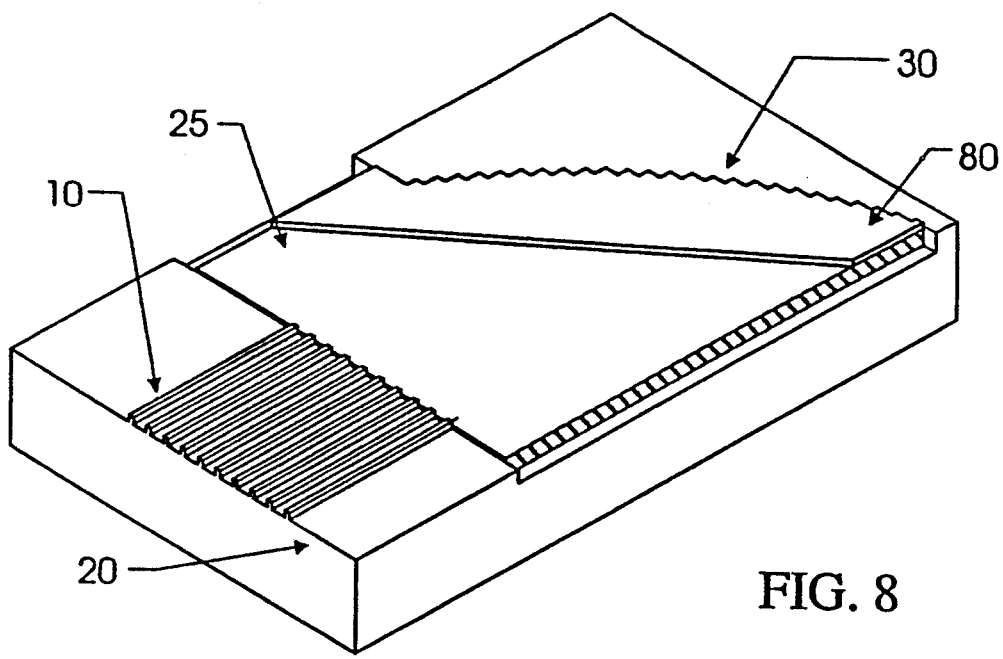
FIG. 8
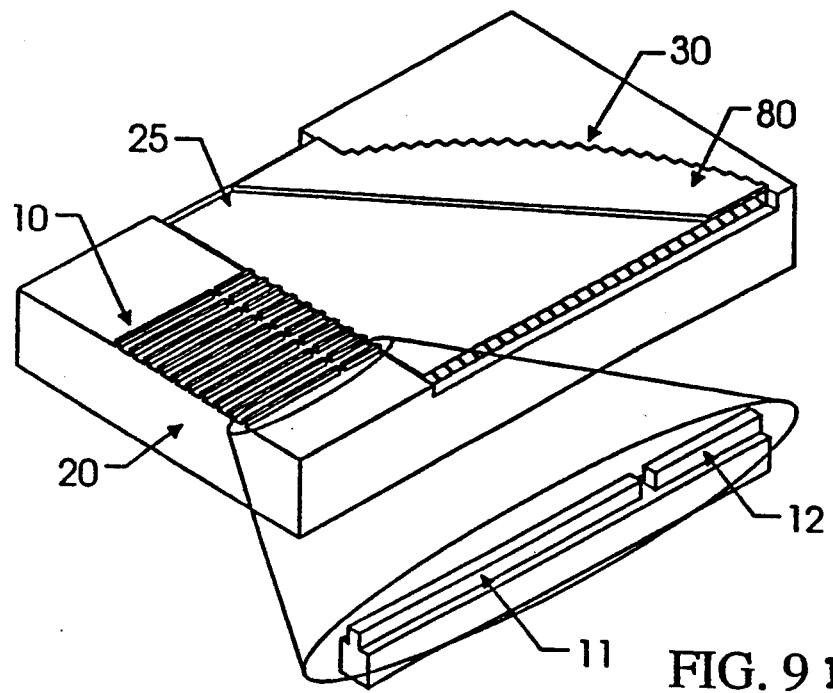
FIG. 9 A
FIG. 9 B

MONOLITHICALLY INTEGRATED WAVELENGTH DIVISION MULTIPLEXING LASER ARRAY

FIELD OF THE INVENTION

This invention in general relates to optical fiber communication systems and in particular to wavelength division multiplexing using laser arrays monolithically integrated with optical gratings.

BACKGROUND OF THE INVENTION

In the near term and beyond, integrated optoelectronic devices will greatly increase the operating speeds and data transfer capabilities of present computing and communication systems. The present invention involves optical communication systems that use wavelength division multiplexing (WDM). This technology allows a telecommunication network to support multiple simultaneous users by partitioning a fiber's large bandwidth into a finite number of channels. Thus, the traffic generated by several users ($S_1, S_2, \ldots S_N$) is superimposed in a parallel form in one optical fiber, using a set of wavelengths ($\lambda_1, \lambda_2, \ldots, \lambda_N$). The design of the WDM systems are conditioned by the availability of suitable sources, multiplexers and demultiplexers. The present invention describes a WDM diode laser structure for generating light signals of discrete wavelengths using a monolithic structured device.

Prior art optical WDM methods include angular dispersion, optical filters and optical absorbers. The present invention uses the angular dispersion technique and in particular uses the geometric properties of a Rowland Circle type diffraction grating to achieve multi-channel WDM.

The closest known prior art that use the Rowland circle geometry for WDM dispersion of optical signals are contained in "Planar Rowland Spectrometer for Fiber-Optic Wavelength Demultiplexing" by Yen et al. published in Optics Letters, Vol. 6, No. 12 pp. 639–641 (1981) and "Monolithic InP/InGaAsP/InP Grating Spectrometer for the 1.48–1.56 um Wavelength Range" by Soole et al. published in Applied Physics Letters, Vol. 58, No. 18, pp. 1949–51, (1991). These articles teach the basic concept of using the Rowland gratings for spectrometer applications, but neither reference disclose or suggest an integrated array of laser source arrangement with grating in a monolithic construction for signal generation/amplification applications.

There are a number of WDM devices which are, however, different from the instant invention. These include Hunsperger et al.'s U.S. Pat. No. 4,773,063 optical WDM system that use a Bragg grating with a wavelength tuning means by use of an electro-optic grating within a planar waveguide configuration. Another device is Mahapatra et al.'s U.S. Pat. No. 4,715,027 which shows a WDM device of monolithic construction with an echelon grating. Neither of these inventions teach or suggest the instant invention's use of the Rowland gratings special diffraction properties or use a common directed array of diode lasers for an input signal/amplifier means within a monolithic construction.

Other teachings that show a multiple array of solid state laser device within a common monolithic construction include Hara et al.'s U.S. Pat. No. 4,971,415 which discloses a multi-beam laser emitting device with waveguide portion that is used for a light source in a plural beam scanning apparatus for recording purposes. However, this teaching does not disclose or suggest the use of a Rowland grating device as part of its monolithic construction wherein the grating forms part of the wavelength-feedback extended cavity.

SUMMARY OF THE INVENTION

The instant invention is an integrated diode laser structure which incorporates a diode laser array with a wavelength-feedback extended cavity via a Rowland circle design and an output channel concentrator and/or a wavelength controller as options. The device is a monolithically integrated structure. Devices based on this concept can be applied to various optical signal processing and/or optical interconnect applications: as a multiple wavelength WDM source, a mode-locked high bandwidth with a short pulse characteristics source, and a multiple wavelength optical to optical switcher and/or modulator, to name just a few.

There are four key components of the invention. One is a Bragg diffraction laser array which produces different wavelength outputs. The second is a multi-channel optical amplifier based on two laser arrays coupled by a concave diffraction grating. The third is a multiplexed channel concentrator in which an output coupling channel combines all laser beams when the device is operating in an even diffraction order condition. Finally, a wavelength tuning device which can be used in all the devices encompassed by the invention.

It is a primary object of the invention to provide telecommunications networks that support multiple data channels using a single optical fiber transmission path with a device that requires no alignment when installed.

It is another object of the invention to use a Rowland circle based grating in a laser diode monolithic construction that produces output beams of varied wavelengths with a required diffraction efficiency and resolution for aperture aberration control.

It is another object of the invention to make a WDM device by monolithic techniques for active integrated opto-electronic device applications that are simple and economical to fabricate.

BRIEF DESCRIPTION OF THE DRAWINGS

FIG. 8 illustrates the device's electro-optic wavelength tuning feature for fine tuning of the WDM laser wavelengths.

FIGS. 9A and 9B illustrates a further embodiment of FIG. 8 for fine tuning the individual laser wavelength using a dual gate laser structure.

DETAILED DESCRIPTION OF THE INVENTION

This invention relies on geometrical properties of various extended cavity configurations of a laser using a curved grating. We will describe in detail two types of geometry which may be used. We designate them by "Classical Rowland Circle Geometry", and "Rolling Rowland Circle Geometry". Other geometries can be derived from these two basic cases by rearranging the location, orientation of the laser cavities and/or waveguides to satisfy a particular system requirement.

Figure 1:
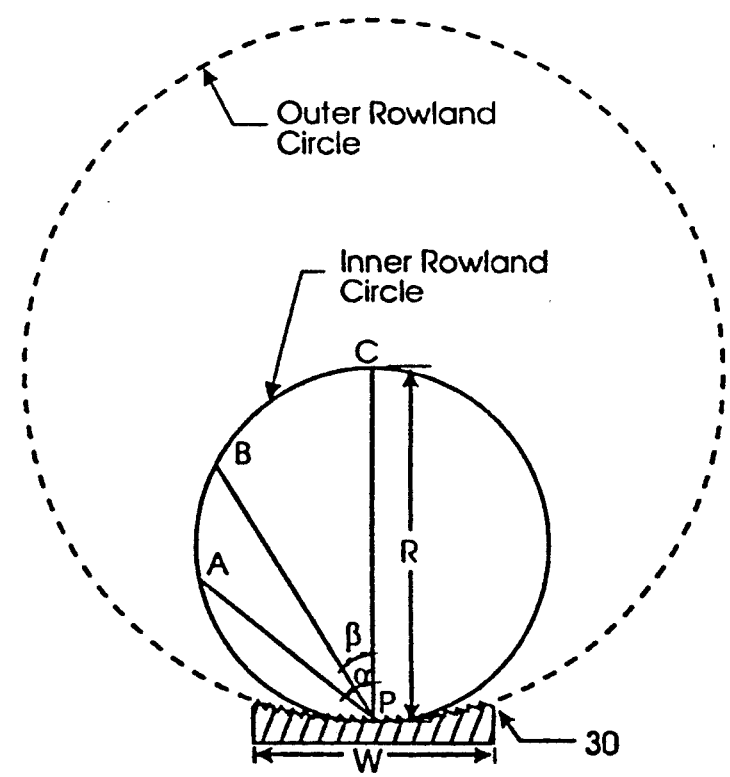
FIG. 1 illustrates the basic Rowland circle based grating properties.

The Classical Rowland Circle geometry is based on a property discovered by Rowland in 1882. It has been widely applied to compact and high performance spectrometers. The optical configuration consists of a curved grating of radius R, whose grooves are so designed as to be equally spaced on the chord of the circular arc. The light radiated by a point source located on an inner tangent circle of radius R/2, A, focuses into as many spectra as orders on the same circle, B, according to the formula:

$$\sin\alpha + \sin\beta = \frac{m\lambda}{d}$$

where m is the diffracted order, $\lambda$ the wavelength, d the groove spacing, $\alpha$ and $\beta$ the incidence and diffraction angles. This is conceptually shown in FIG. 1 where grating (30) has a curvature corresponding with a radius of R centered at point C.

Figure 2:
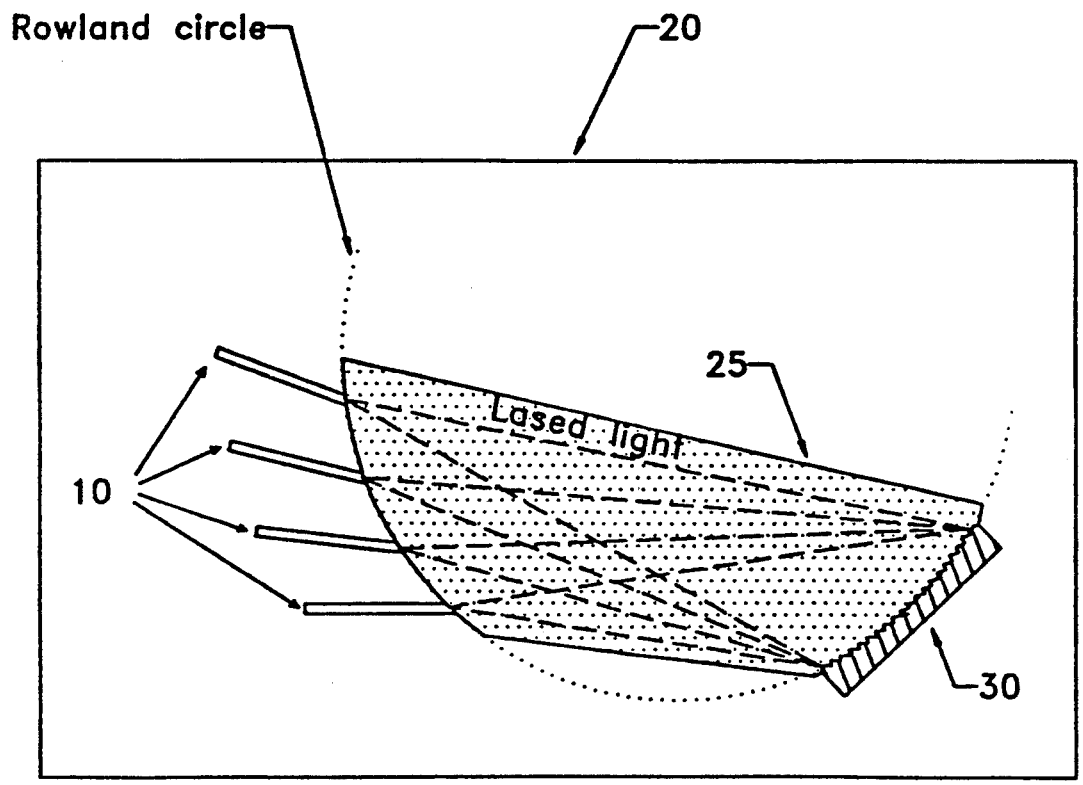
FIG. 2 conceptually illustrates the multiple diode laser array with the Rowland circle based grating.
Figure 3:
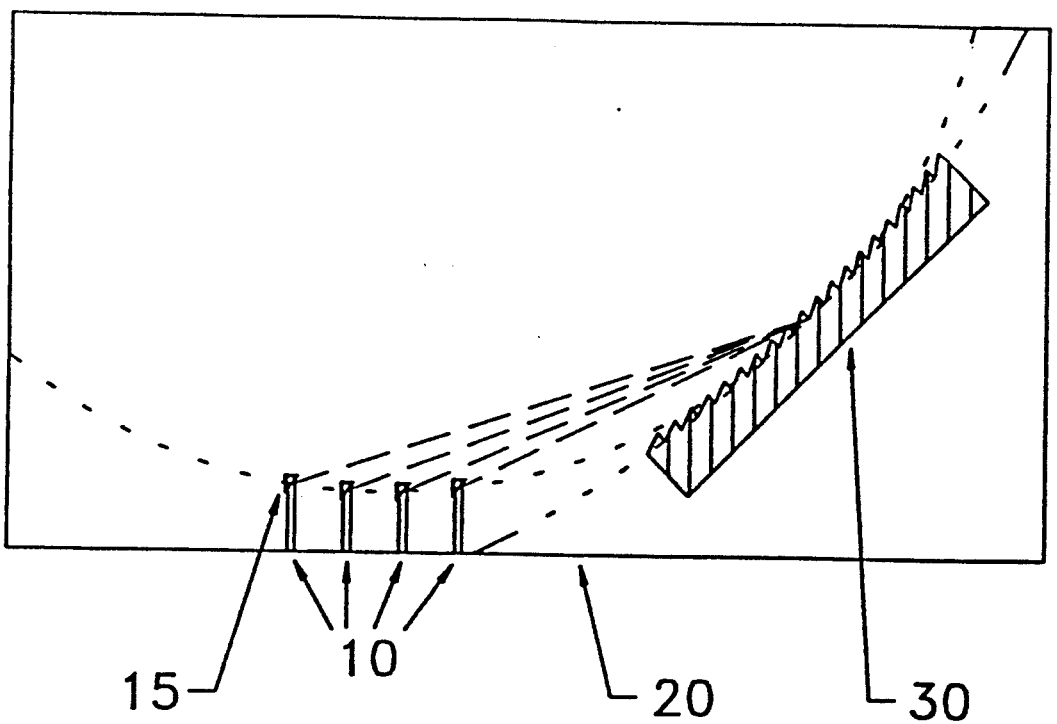
FIG. 3 conceptually illustrates an additional embodiment of micro-mirrored lasers with the Rowland circle based grating for parallel laser positioning on the substrate.

By choosing an appropriate grating period and incident angle, the Rowland circle configuration can diffract the light at wavelength $$\lambda = \frac{2d}{m} \sin\alpha$$

back to the incident spot A. If a diode laser is placed at the incident spot, an optical configuration utilizing the Rowland circle design forms a wavelength-selecting external cavity and will tend to force the laser to operate at a preselected wavelength. If the laser is rotated slightly along the Rowland Circle, the center of rotation being the center of the curved grating, the incident angle with respect to the concave grating changes slightly and the feedback wavelength to the new laser position is shifted from the previous one. A diode laser located at this new position is forced to lase at a slightly different wavelength. Therefore, a multiple wavelength diode laser array based on this concept and the wavelength separation of each adjacent laser can be designed as well as shown in FIG. 2, where diode lasers (10) are made by etching facets in a laser substrate wafer (20). The lasers (10) are not parallel to each other and have to be etched in wafer (20) by a high resolution etching technique, e.g. chemically assisted ion beam etching. The medium between the laser array and the Rowland grating, which all the laser beams propagate through, is a low loss planar waveguide region. The planar waveguide can be made of materials (25) that includes GaAs or AlGaAs similar to that of the diode laser or other dielectric materials, see "GaAs/AlGaAs Quantum Well Laser with Monolithically Integrated Extended Glass Waveguide Cavity" by Wu et al. in Electronics Letters, Vol. 27, pp. 1954–55 October 1991. An alternate design includes using micro-mirrors (15) to reflect the light from the lasers (10) in a parallel direction, which allows for making the laser facets of the whole array via a single cleaving operation, as shown in FIG. 3. Techniques for making the diode lasers includes methods described in Hara et al.'s U.S. Pat. No. 4,971,415, which is hereby incorporated by reference.

Figure 4:
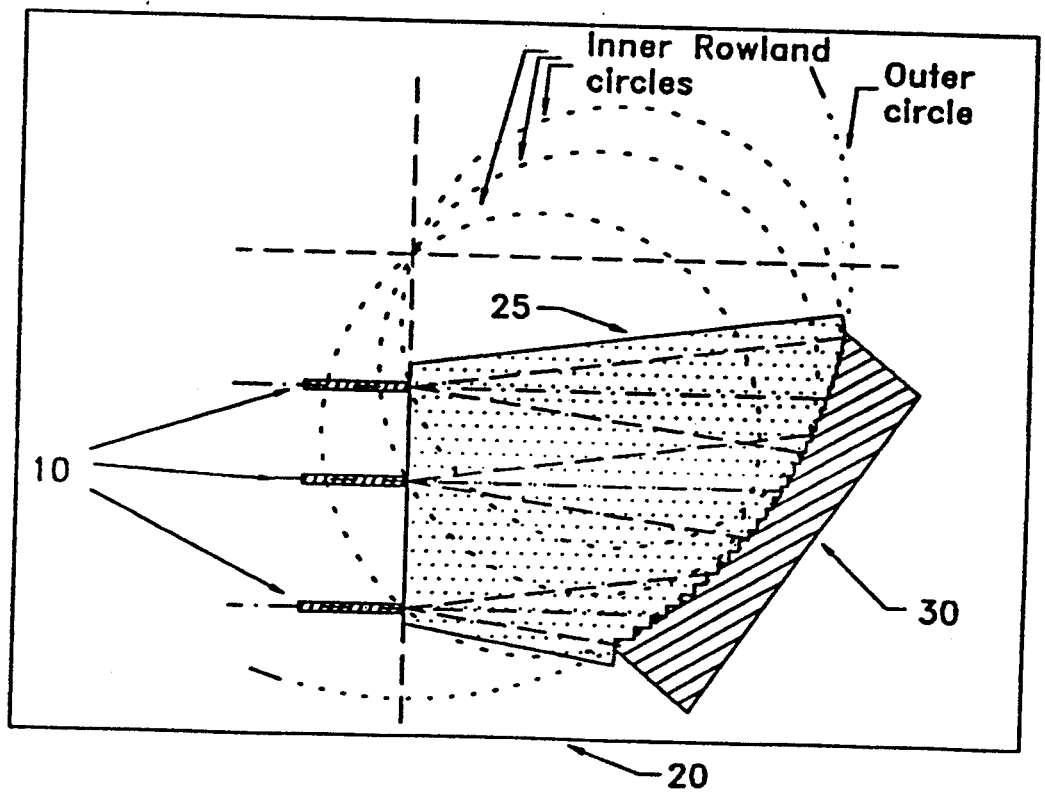
FIG. 4 conceptually illustrates the rolling Rowland circle design with laser positioning relative to a curved grating.

The rolling Rowland circle geometry uses a curved grating defined in a different manner. Instead of being equally spaced on the chord, the grooves are designed to be equally spaced on the circle itself. With such a grating, we can make the Rowland circle roll around the center of curvature of the grating. In that case, the lasers (10) can be designed parallel to each other as shown in FIG. 4. A different Rowland circle corresponds to each laser where each laser (10) faces the grating with a different angle. This type of laser with corresponding grating geometry allows for respective parallel lasers within the array that requires only a single cleaving fabrication technique for making the laser array facets.

Aberrations are a major limiting factor for these structures. The geometrical properties used are actually valid only for the rays which hit the grating close to the axis defined by the laser direction. The light at a given wavelength, that is radiated by a point source located on the Rowland circle does not focus into an ideal point image, but rather within a small area in the neighborhood of this point. Thus, the aberrations dealt with are aperture aberrations. Limiting the maximum phase difference in the lased light's wavelength $\lambda$ to not exceed $\lambda/4$, gives the width of the grating within which the diffracted light reinforces the image and contributes to the resolution of the grating.

In the case of the planar classical Rowland circle geometry, the spherical aberration in a planar geometry is considered. The maximum grating width used is given by:

$$W_{max} = 2 \times \left[ 2R^3 \frac{d}{m} \frac{1}{\tan\alpha} \right]^{\frac{1}{4}},$$

which in most cases is not critical.

In the case of the rolling Rowland circle geometry, aberrations are more of a concern. The aberration encountered is similar to coma. This aberration lowers the resolution of the grating, and is responsible for a significant power loss. The phase error increases with the cube of the number of grooves. The available width of the grating is:

$$W_{max} = 2 \times \left[ \frac{3}{4} \frac{d}{m} R^2 \right]^{\frac{1}{3}}.$$

This requirement is much more constraining than the classical case. For example, with $\alpha=70$ deg. and $R=20$ mm and an index of refraction of 3.4 (for GaAs), the maximum usable grating width is 1850 μm for the classical Rowland circle geometry and 680 μm for the rolling Rowland circle geometry. The aperture is determined by the width of the mode at the output of the lasers. For a 4 μm-wide mode, the illuminated area of the grating ($1/e^2$ irradiance contour of the beam) is about 1500 μm. The classical geometry presents no problem. However, the rolling Rowland circle geometry presents some difficulty since about 30% of the diffracted light focuses outside the Gaussian image which introduces considerable optical power loss.

Aberration correction methods can be used to optimize the diffraction grating and improve the coupling efficiency of the refracted light inside the laser. Further, since the pattern of the grating can be directly designed and fabricated with high resolution techniques, the grating shape can be fabricated with desirably located grooves for optimized diffraction efficiency.

Fabrication of the device's laser and grating requires monolithic processing techniques on the laser wafer. Such techniques for making includes in Hara et al.'s U.S. Pat. No. 4,971,415. Other teachings for making the device with a submicron grating, on an opto-electronic wafer is taught in "Spectrometer on a Chip by Nanofabrication", J. Hryniewicz, Y. J. Chen and R. Tiberio, Digest of LEOS Summer Topical Meeting on Micro fabrication for Photonics and Optoelectronics, p. 16 (1991). This type of monolithic design is advantageous since the Rowland circle grating can be customized to optimize the diffraction efficiency and resolution when considering the classical Rowland circle geometry.

Figure 5:
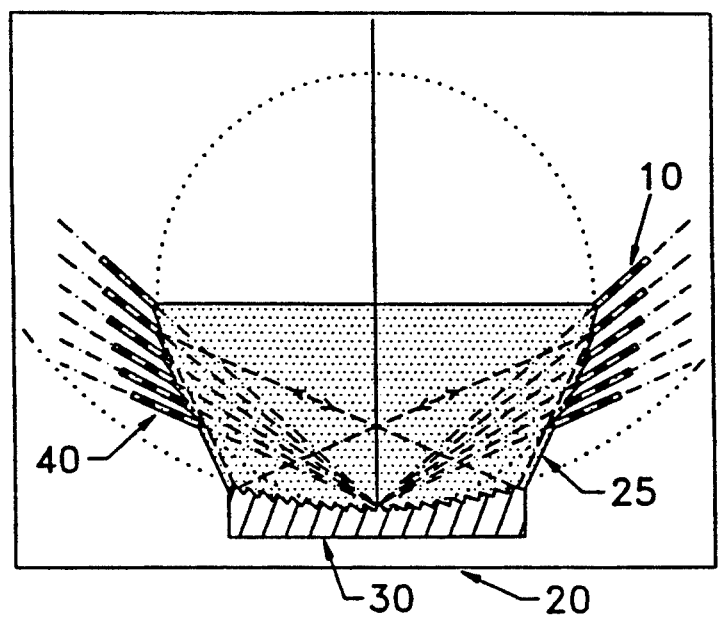
FIG. 5 conceptually illustrates a WDM optical amplifier using a classical Rowland circle grating using a pair of diode laser arrays where one is for WDM signal inputs and the other amplifies or provides a multiple coupling waveguide output for the device.

The device can operate as a WDM amplifier. If another identical laser array (40) is placed at the mirror image side of the grating normal as shown in FIG. 5, then the grating can serve as a wavelength dependent connector. A WDM input beam from one laser channel (10) of one array will be directed to the corresponding optical amplifier channel of the other array (40). This operation works with all grating diffraction orders, although the even order cases will also allow each laser array to operate as a WDM laser source as described below and therefore allows the device to operate as an all optical device where an optical signal controls optical signal. Array (40) can also provide an output waveguide means for the device.

The invention also includes a channel concentrator feature for output of WDM signals which is a special optical characteristic of a Rowland circle grating. If the grating is designed in such a way that the laser array operates in the $2k^{th}$ order, then the $k^{th}$ order is focused at the center of curvature of the grating. Indeed:

$$2\sin\alpha = \frac{2k\lambda}{m} \rightarrow \sin\alpha = \frac{k\lambda}{d}$$

The $k^{th}$ order is such that:

$$\sin\alpha + \sin\beta = \frac{k\lambda}{d} \rightarrow \beta = 0$$

Figure 6:
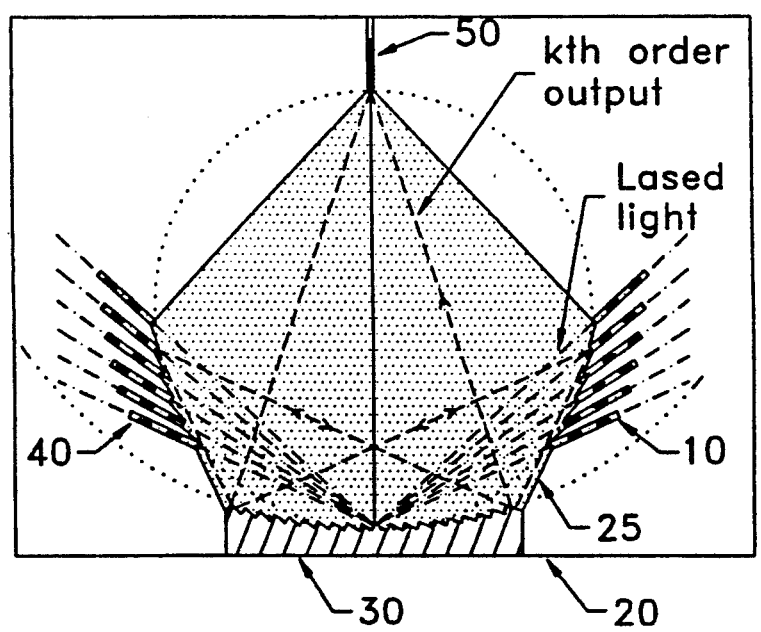
FIG. 6 illustrates a WDM optical amplifier in accordance with FIG. 5 with channel concentrator as a waveguide output for the device with kth order signal output capability.
Figure 7:
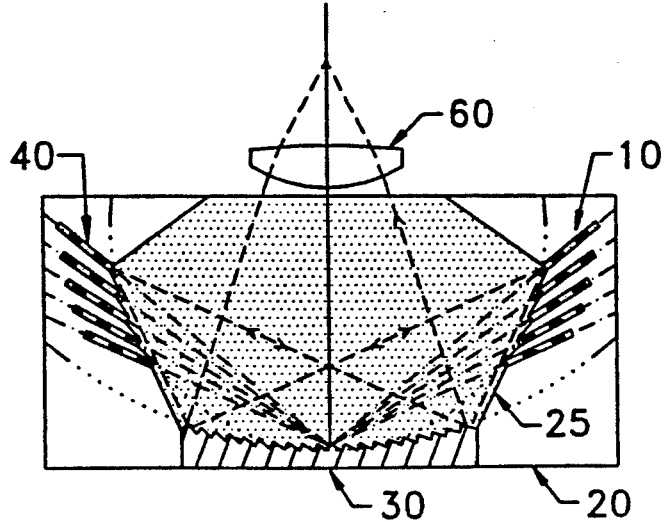
FIG. 7 illustrates a further embodiment of FIG. 6 where a lens is used in lieu of a concentrator.

This phenomenon allows the combination of the optical signals at different wavelengths into a single waveguide and/or optical fiber, termed a channel concentrator, for output of the signals. The use of a concentrator (50) is shown in FIG. 6. This concentrator (50) can be incorporated in the standard WDM laser array as shown in FIG. 2 and 3. It can also be incorporated with the optical amplifier design discussed above, FIG. 5. Alternatively, a lens (60) can be incorporated with the device, without a monolithically integrated concentrator channel, to collect the WDM output signals as shown in FIG. 7.

The operating wavelength of each diode laser channel is determined by the grating period, incident angle of the laser channel with respect to the tangetial of the arc of concave grating, and the optical index of the diode laser which is a function of the laser operating condition. Given that the lasers are fabricated monolithically right next to each other on a compound semiconductor wafer (20), the separation between two lasers is typically 20 to 50 μm, and all the lasers operate under approximately similar conditions, then the wavelength separation between two adjacent lasers is determined by the array geometry. However, the absolute output wavelength is subject to processing fluctuations and the laser operating conditions. Since the wavelengths of the lasers are regulated by the diffraction feedback of the concave grating, the output wavelength of a laser can be adjusted by modifying the grating diffraction condition. The grating diffraction condition for a Littrow configuration is:

$$\lambda = 2d \sin(\alpha)/(m\ n),$$

where $\lambda$ is the laser wavelength which satisfies the Bragg condition, $\alpha$ is the incident angle to the grating, d the grating period, m the grating diffraction order and n the index of refraction of the waveguide at the grating surface. By putting an index adjusting device (80) as shown in FIG. 8 in the waveguide next to the grating surface, the effective grating period of the Rowland grating can be adjusted. The index adjusting device (80) means includes a structural feature using either an external electric field (known as electro-optic tuning) or current injection. Electro-optic tuning techniques is well known in the art, see Husband's U.S. Pat. No. 4,571,024 which is hereby incorporated by reference. Since the laser array is highly integrated, this technique can be used to adjust the operating wavelengths of all lasers (10) simultaneously, not individually. This allows control of the absolute wavelength of one of the lasers (10), termed the reference channel, where the relative wavelengths of the other channels are governed by the actual physical location of the individual lasers (10) in the array.

Another tuning technique includes current injection tuning using a dual gated diode laser structure as shown in FIGS. 9A and 9B. The absolute wavelength of each laser can be fine tuned by adjusting the current injection into the second gate (12) to each diode laser (10). In this dual gate diode laser structure, the first gate (11), typically a long one, supplies current for the laser power and the second gate (12) tunes the lasing wavelength by fine tuning the index of refraction of the laser cavity via current injection. This concept can also incorporate the grating tuning device (80) described above.

BEST MODE OF OPERATION

The various concepts described above can be used individually or combined together to produce special devices/subsystems for communication and signal processing applications. Placement of the lasers relative to the grating can be modified according to required geometry of the structure to obtain the same output requirements.

Figure 10:
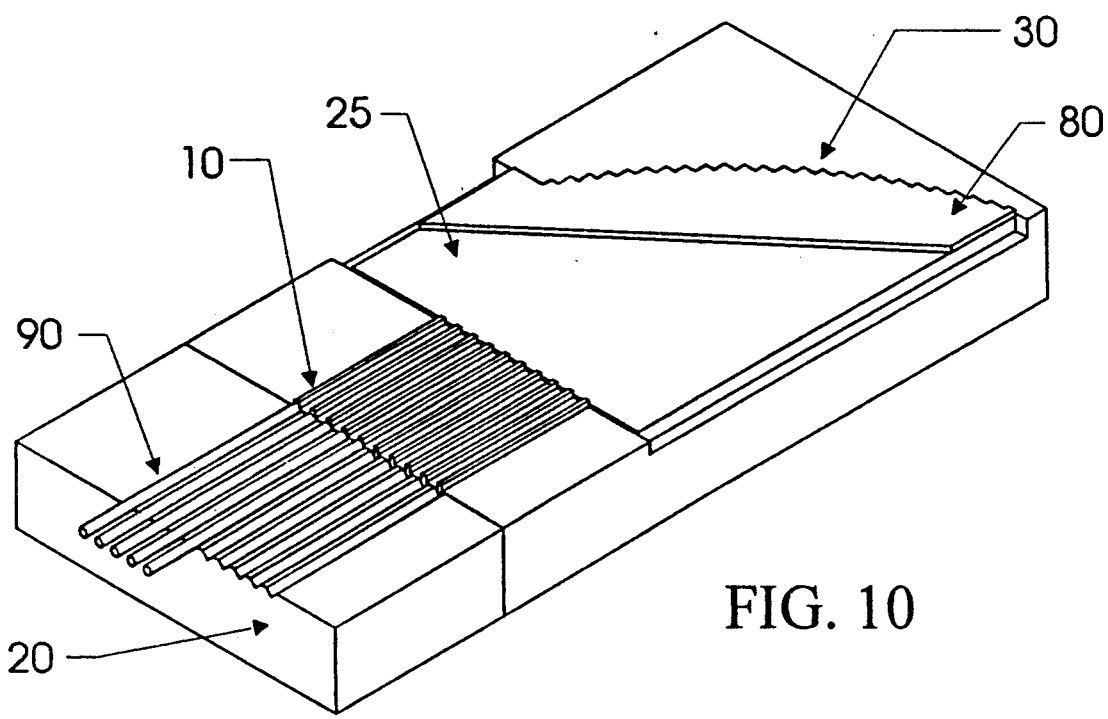
FIG. 10 illustrates the monolithic WDM laser source with corresponding Rowland circle grating along with an optical fiber array output.

FIG. 10 illustrates an optical fiber coupled monolithic multiple-wavelength WDM laser array (10) with the Rowland circle grating (30). All of the laser channels can be coupled out via a linear optical fiber array (90). Standard techniques for output coupling is discussed in Hunsperger et al's U.S. Pat. No. 4,773,063. which is incorporated by reference. The output wavelength of each laser is determined by the Bragg diffraction condition discussed above. The channel (wavelength) separation is determined by the distance separating the adjacent lasers. Customized concave grating structures can be designed and fabricated to reduce or eliminate aberrations and optimize the performance of the WDM source.

The wavelength of the output channels of the monolithic WDM laser source with grating can be fine tuned globally by an electro-optic tuning device (80) near the grating as shown in FIG. 8 and/or individually by the tuning gates (11) and (12) of each diode laser as shown in FIG. 9. The electrode (80) can change the index of refraction of the waveguide via either the electro-optic effect or current injection effect as discussed above. The device can operate with a channel concentrator (50) as shown in FIG. 6 with or without the optical amplifier array (40).

Figure 11:
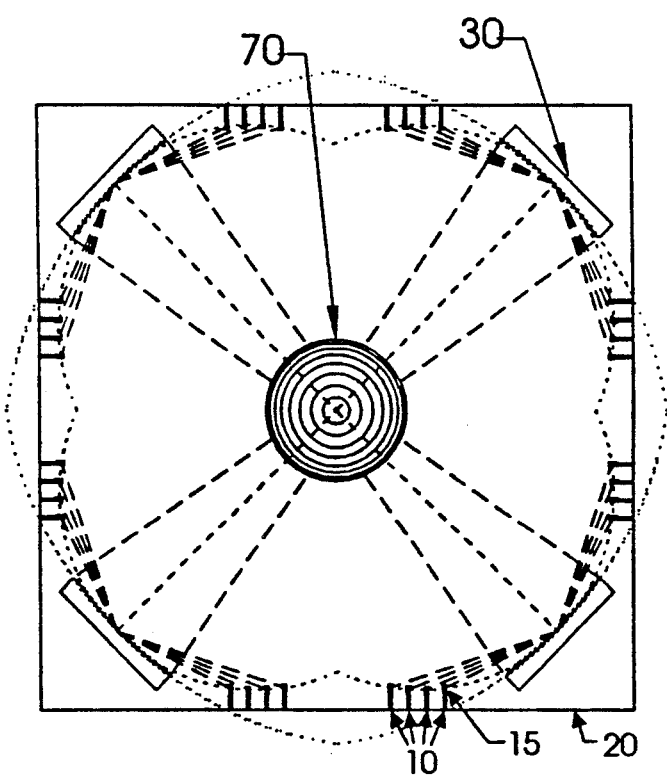
FIG. 11 illustrates a surface emitting high capacity WDM laser with a Fresnel lens as the concentrator which provides a coupling means for optical signal output from the device.

The invention can also be used as a surface emitting high capacity WDM laser source with a lens (70) structure as shown in FIG. 11. The motivation is to increase the number of different wavelengths emitted, for a higher transmission capacity. All the elementary structures are arranged around their common center of curvature. The lens (70), i.e. a Fresnel lens, extracts the beams converging toward the center vertically out of the chip. The elementary structures can be designed identically, and the different sets of wavelengths shifted with respect to one another by using the electro-optic wavelength-tuning devices described above. The present invention is not restricted to the above described embodiments, but other various applications thereof are possible.

What is claimed is:

1. An active integrated and monolithic optical waveguide device used for wavelength division multiplexing of multiple wavelength optical signals using an extended laser cavity configuration in combination with diffraction grating comprising: at least one first commonly directed array of diode lasers which are an input signal means to the device whose lased light is directed at a corresponding grating, a corresponding multiple optical coupling waveguide means positioned symmetrically on the device with respect to the first array of diode lasers and a surface normal of the corresponding diffraction grating's centerline, the corresponding diffraction grating is etched in accordance with a Rowland circle designed optical properties and the first laser array placement on the optical device whereby light from the commonly directed first array of diode lasers impinges upon the grating and a selected diffraction order signal output is concentrated into a single multiplexed output signal through an output optical means.

2. The device of claim 1 wherein the diode lasers are Bragg diffraction lasers.

3. The device of claim 1 wherein the corresponding multiple optical coupling waveguide means is a second commonly directed array of diode lasers.

4. The device of claim 3 wherein the second commonly directed array of diode lasers is an output coupling means for an amplified output signal from the device.

5. The device of claim 3 wherein several corresponding first and second array of diode lasers are arranged around a common planar center of curvature whereby the multiplexed output signals from each corresponding first and second arrays of lasers forms a single concentrated signal for transmission to the output means.

6. The device of claim 1 wherein the grating is a planar grating construction that is etched in accordance with a rolling Rowland circle design geometry.

7. The device of claim 1 wherein the grating is a circular grating construction that is etched in accordance with a classical Rowland circle design geometry.

8. The device of claim 1 wherein the grating is an electro-optic grating for a wavelength tuning means of the input signals to the device.

9. The device of claim 1 wherein the first commonly directed array of diode lasers have dual gates where one of the gates is a wavelength tuning means of the device's input signals.

10. The device of claim 1 wherein the output optical means is a concentrator.

11. The device of claim 1 wherein the output optical means is a lens.

12. The device of claim 5 wherein the grating is an electro-optic grating for a wavelength tuning means of the input signals to the device.

13. The device of claim 5 wherein the first commonly directed array of diode lasers have dual gates where one of the gates is a wavelength tuning means of the device's input signals.

14. The device of claim 5 wherein the output optical means is a lens.

15. An active integrated and monolithic optical waveguide device used for wavelength division multiplexing of multiple wavelength optical signals using an extended laser cavity configuration in combination with diffraction grating comprising: at least one first commonly directed array of diode lasers which are an input signal means to the device whose lased light is directed at a corresponding grating, the corresponding diffraction grating is etched in accordance with a Rowland circle designed optical properties and the first laser array placement on the optical device whereby light from the commonly directed first array of diode lasers impinges upon the grating and a selected diffraction order signal output is concentrated into a single multiplexed output signal through an output optical means.

16. The device of claim 15 wherein the grating is a planar grating construction that is etched in accordance with a rolling Rowland circle design geometry.

17. The device of claim 15 wherein the grating is a circular grating construction that is etched in accordance with a classical Rowland circle design geometry.

18. The device of claim 15 wherein the grating is an electro-optic grating for a wavelength tuning means of the input signals to the device.

19. The device of claim 15 wherein the first commonly directed array of diode lasers have dual gates where one of the gates is a wavelength tuning means of the device's input signals.

20. The device of claim 15 wherein the output optical means is a concentrator.

21. The device of claim 15 wherein the output optical means is a lens.

22. The device of claim 15 wherein the diode lasers are Bragg diffraction lasers.

* * * * *